United States Patent

[11] 3,586,147

[72] Inventor Wayne C. Hoffman
 Glastonbury, Conn.
[21] Appl. No. 627,384
[22] Filed Mar. 31, 1967
[45] Patented June 22, 1971
[73] Assignee Litton Business Systems, Inc.

[54] DECELERATING MECHANISM
2 Claims, 5 Drawing Figs.

[52] U.S. Cl. ..................................................... 197/64
[51] Int. Cl. ..................................................... B41j 19/02
[50] Field of Search ............................................ 197/64,
 183, 136

[56] References Cited
UNITED STATES PATENTS

| | | | |
|---|---|---|---|
| 1,233,532 | 7/1917 | Wilbur et al. | 197/183 UX |
| 2,209,512 | 7/1940 | Crosman | 197/183 X |
| 1,003,414 | 9/1911 | Barrett | 197/64 X |
| 1,753,195 | 4/1930 | Bache et al. | 197/64 |
| 2,239,643 | 4/1941 | Carpenter | 197/136 |
| 2,826,287 | 3/1958 | Dodge | 197/183 |
| 2,829,754 | 4/1958 | Morcross | 197/64 |
| 2,854,124 | 9/1958 | Dodge et al. | 197/183 |
| 2,879,879 | 3/1959 | Dodge | 197/183 |
| 2,926,769 | 3/1960 | Toeppen | 197/183 X |
| 3,048,255 | 8/1962 | Israelson | 197/183 |
| 3,313,387 | 4/1967 | Lenney | 197/183 X |
| 3,288,260 | 11/1969 | Sargent | 197/64 |

Primary Examiner—Ernest T. Wright, Jr.
Attorneys—Joseph R. Spalla and Thomas S. Ross ABSTRACT: Mechanism for decelerating a moving mass during a predetermined terminal portion of its travel in advance of a final stop whereby it is arrested with a minimum of shock. The mechanism duplicates the velocity sensitive energy absorbing qualities of a pneumatic dashpot. In accordance with the invention the kinetic energy of the moving mass is transferred to a spring which in turn applies the energy stored therein to accelerate a movable mass which dissipates the energy in the form of heat. A specific application is as an energy absorbing system for a typewriter carriage wherein carriage motion is resisted by a shock absorbing spring which applies torque to drive a rotatable mass in the form of a flywheel thus reducing the speed of the carriage in advance of a final stop to enable escapement mechanism to regain control of the carriage at the final carriage position, the energy of the carriage thereafter being dissipated by friction of the rotating mass.

PATENTED JUN22 1971
3,586,147
SHEET 1 OF 2
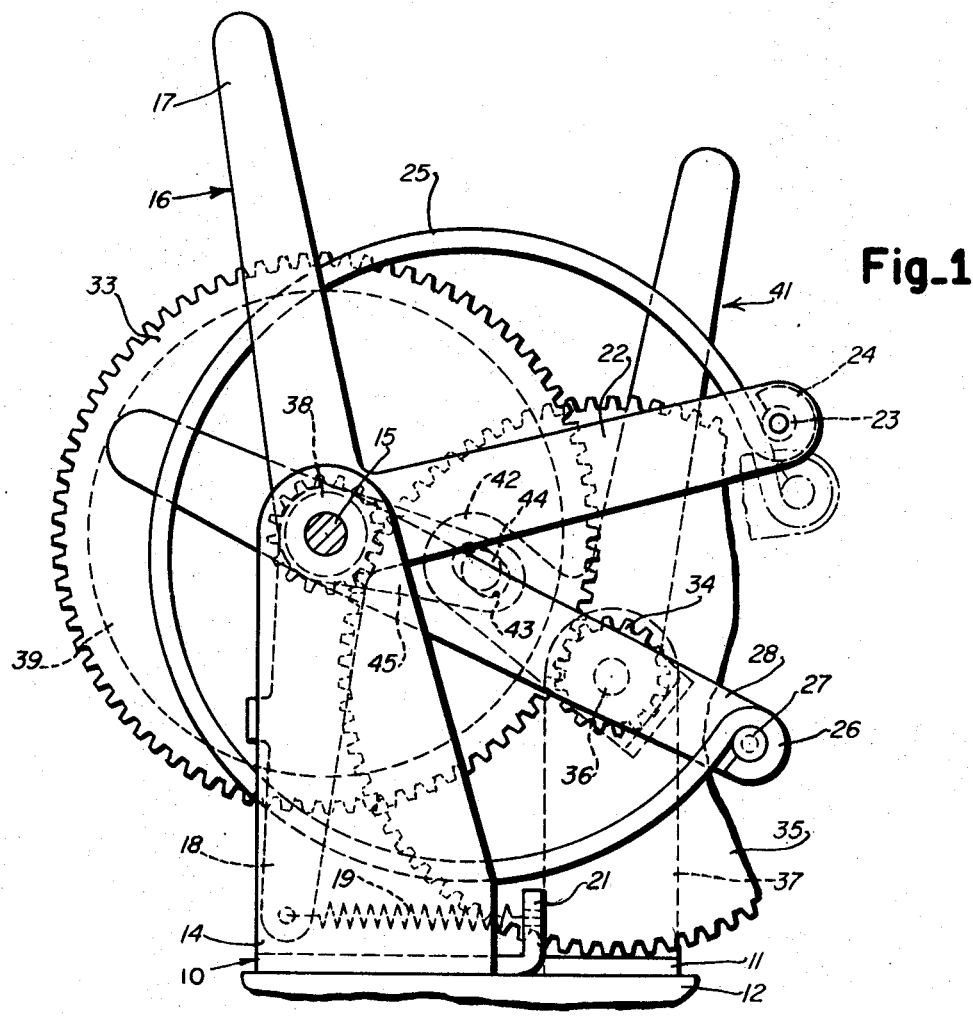
Fig_1
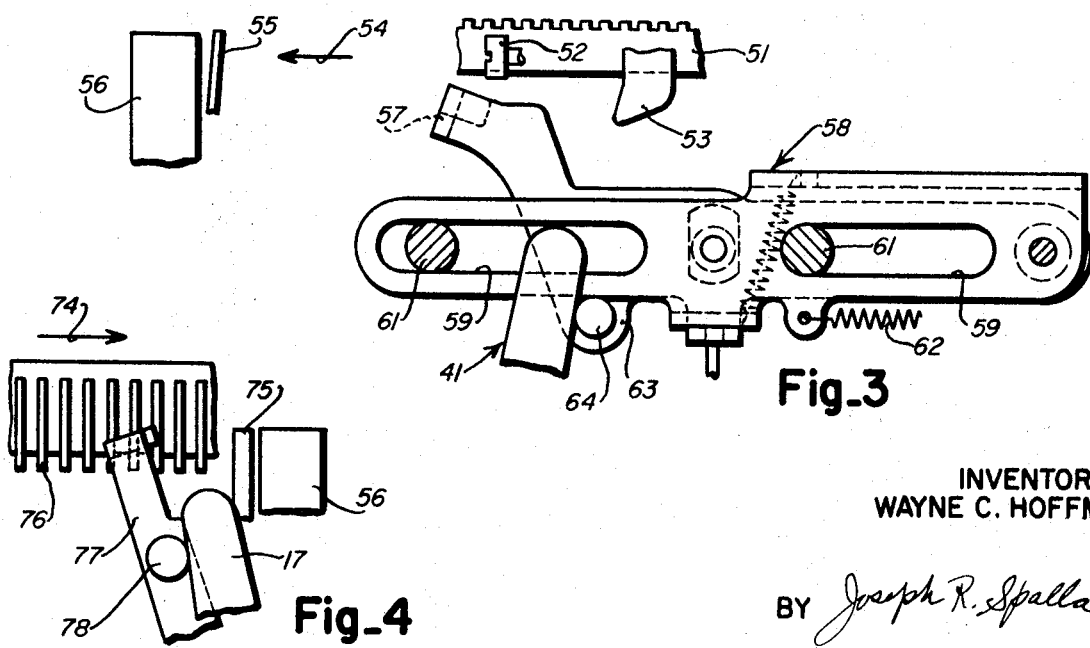
Fig_3
Fig_4
INVENTOR
WAYNE C. HOFFMAN
BY Joseph R. Spalla
ATTORNEY

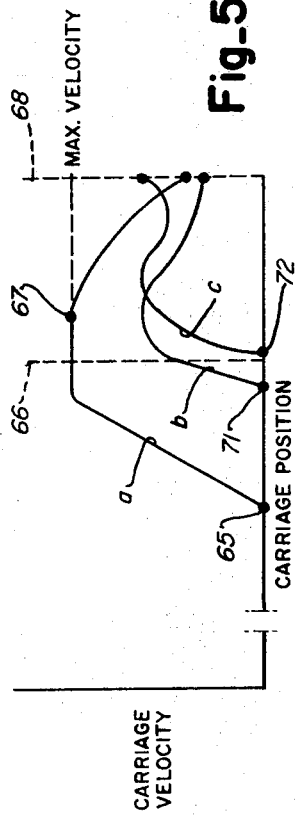
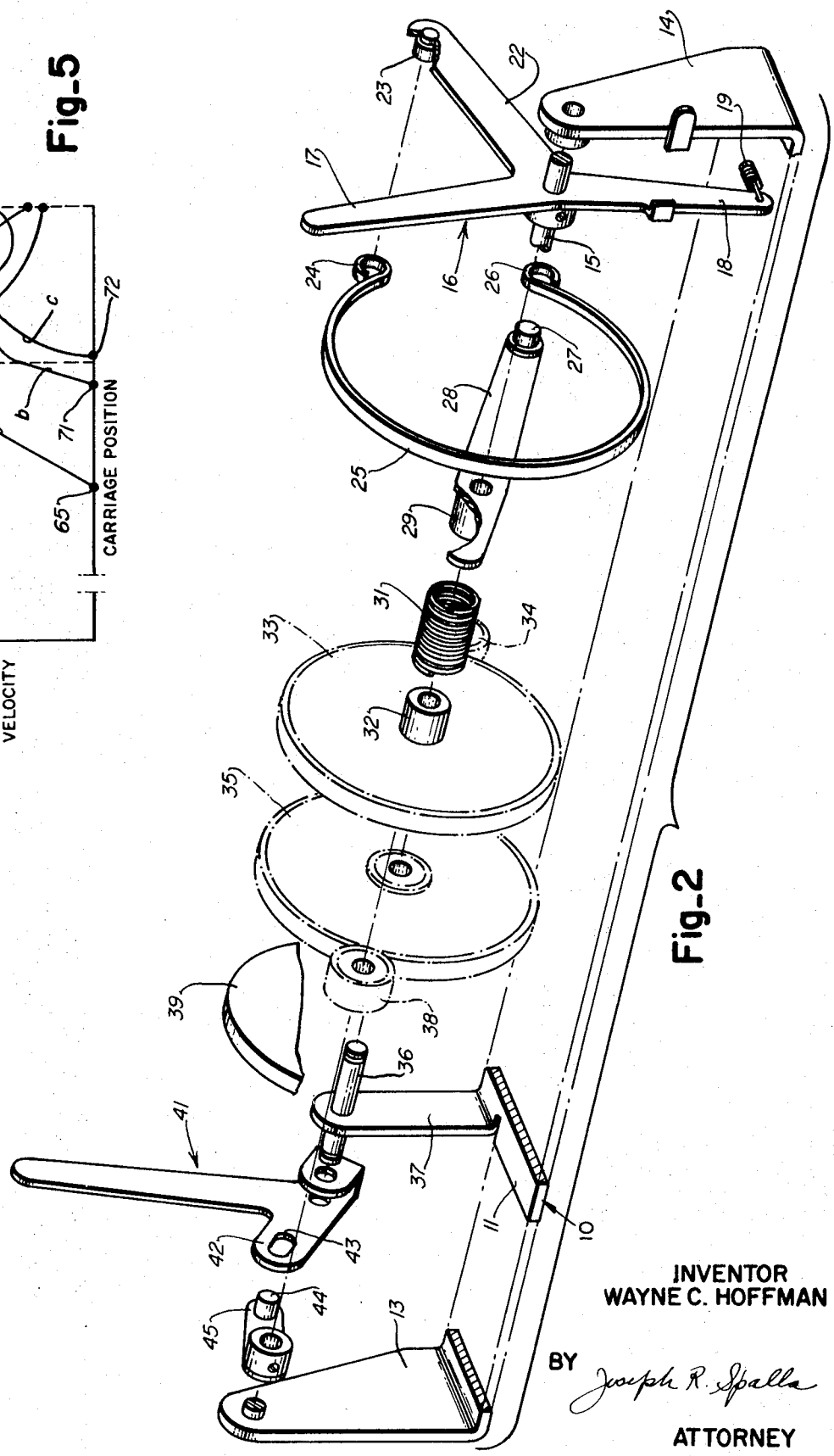

DECELERATING MECHANISM

This invention relates to energy absorbing mechanism operable to reduce the speed of a moving mass during a terminal portion of its movement in advance of a final stop; and specifically it relates to a typewriter carriage decelerating mechanism characterized by a spring to which carriage energy is transferred and which in turn applies the energy stored therein to drive a mass, the movement of which dissipates the energy.

The weight of a mass, e.g., a typewriter carriage, and the speed at which it must be moved to secure maximum work output creates a problem in properly cushioning the mass so as to avoid undue shock and noise when the mass is arrested.

The prior art employed the lateral movement of a tabulating or carriage return abutment, engaged by the carriage in advance of a final stop, to decelerate the carriage in the final portion of its movement. Specifically the motion of the tabulating or carriage return abutment was connected through amplifying linkage to a pneumatic dashpot which absorbed and dissipated the kinetic energy of the carriage. These dashpots and associated linkages are costly and difficult to adjust to accommodate short low velocity, and long high velocity carriage runs.

In accordance with the invention there is provided a movable part which is engaged by the carriage a predetermined distance in advance of a final carriage stop and moved thereby until the carriage reaches its final stop position. The motion of the movable stop is transmitted to and resisted by a spring which in turn applies the energy stored therein to accelerate a rotatable mass. When the carriage is moving at a high velocity substantially all of the kinetic energy will be transferred to the spring and the carriage brought to a final stop before the energy stored in the spring is operative to drive the rotatable mass, whose movement will dissipate the energy. When the carriage velocity is low the energy transferred to the spring will be transferred to the rotatable mass as it is accumulated. In both cases the spring constant of the spring and/or the mass can be predetermined to give a desired final impact velocity of the carriage.

An object of the invention is in the provision of a mechanical device having the characteristic energy absorbing qualities of a pneumatic dashpot.

Another object of the invention is to provide energy absorbing mechanism which accommodates low and high velocity movement of a mass.

A further object of the invention is in the provision of a typewriter carriage decelerating mechanism wherein carriage energy is substantially absorbed by a spring and dissipated subsequent to final arrest of the carriage.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 is an elevational view of energy absorbing mechanism in accordance with the invention viewed from the rear of a typewriter adapted to decelerate carriage movement in carriage return and tabulating directions;

FIG. 2 is a perspective view of the energy absorbing or decelerating mechanism of FIG. 1;

FIG. 3 is an elevational view looking toward the rear of the typewriter showing the carriage return arresting arm and associated elements;

FIG. 4 is an elevational view looking toward the rear of the typewriter showing the tabulation arresting arm and associated elements; and FIG. 5 are carriage velocity vs. displacement curves illustrating the action of the mechanism of the invention.

Referring now to the drawing wherein like reference numerals designate like or corresponding parts and wherein a preferred embodiment is illustrated, there is shown in FIGS. 1 and 2 a U-shaped bracket generally identified by the reference numeral 10, formed to accommodate decelerating mechanism in accordance with the invention. The base 11 of the bracket 10 is securely fastened to the machine frame 12 and the forwardly and rearwardly facing upwardly extending legs 13 and 14 respectively support for rotation a shaft 15 which extends in the front to back direction of the machine.

A tab decelerating arm generally designated by reference numeral 16 is secured intermediate its ends to the shaft 15 adjacent the rear leg 14 with its upwardly extending end 17 located to be engaged and rocked clockwise as will hereinafter be disclosed. The downwardly extending end 18 is connected by a spring 19 to an ear 21 on the base 11 of the bracket 10 to normally bias the tab decelerating arm 16 counterclockwise. The tab decelerating arm 16 is also formed with a laterally extending arm 22 having a pivot pin 23 on its end which is accommodated by a curled over end 24 of a substantially circular flat spring 25. The other curled over end 26 of the circular spring 25 accommodates a pivot pin 27 on the end of a crank 28 rotatably mounted on the shaft 15. An axial boss 29 secured to the crank pivot extends into a clutch wrap spring 31 which also surrounds an axially extending boss 32 of a relatively large gear 33 rotatably mounted on shaft 15. The wrap spring 31 normally frictionally engages both bosses, 29 and 32, and its wind is such that it drivingly connects the crank 28 and gear 33 only when the crank 28 is rotated clockwise as viewed in FIG. 1. The gear 33 is in mesh with a pinion 34 formed axially of another large gear 35 which is rotatably mounted on one end of a stub shaft 36 secured to the end of an upstanding intermediate leg 37 of the bracket 10. The second large gear 35 meshes with a second pinion 38 axially formed on a mass element or flywheel 39 which is rotatably mounted on shaft 15. As will be evident when the tab decelerating arm 16 and the shaft 15 to which it is secured is, as will hereinafter appear, rocked in a clockwise direction as viewed in FIG. 1, it attempts to turn the circular spring 25 through pin 23, but since the motion of the other end 26 of the circular spring 25 is initially resisted by the flywheel mass 39, the energy is transferred to the circular spring 25 i.e. the motion is resisted by the circular spring 25, until the energy stored therein is sufficient to rock crank 28 which in turn through the one way wrap spring clutch 31 drives the flywheel 39 through the speed increasing torque reducing gear system (comprising, gear 33, pinion 34, gear 35, and pinion 38) of the flywheel 39. The purpose of the gear system (comprising, gear 33, pinion 34, gear 35, and pinion 38) allows the use of a relatively small mass element or flywheel 39 which looks large to the input end.

Also as viewed in FIGS. 1 and 2 a carriage return decelerating arm 41 is pivotally mounted on the forwardly extending end of the stub shaft 36 (FIG. 2) and extends upwardly an is adapted to be rocked counterclockwise as will hereinafter appear. The carriage return decelerating arm 41 has a laterally extending arm 42 provided with an elongated slot 43 adapted to receive a pivot pin 44 on the end of a crank 45 secured to the shaft 15 whereby when the carriage decelerating arm 41 is rocked counterclockwise as will hereinafter appear it rocks the crank 45 and shaft 15 which in turn rocks the connected crank 28 associated with the spring 25 and one way clutch 31 to decelerate the carriage as before. As is evident, return spring 19 serves to return arm 41 as well as arm 17.

CARRIAGE RETURN

With particular reference to FIG. 3 there is shown a margin rack bar 51 which is mounted on the typewriter carriage and which supports a margin stop comprising an abutment screw 52 and a depending catch 53. As is understood in the art when a carriage return is called a clutch is engaged and latched and the carriage will be drawn in the direction of arrow 54 as viewed in FIG. 3 until the abutment screw 52 contacts and pushes a clutch knock off paddle 55 adjacent an abutment or centerpost 56 of the machine against the centerpost 56 thereby arresting carriage movement. When the carriage is thereby arrested by abutment or centerpost 56 the escapement regains control of the carriage as will be understood in the art. The depending catch 53 on the margin stop is adapted to engage a lug 57 on a laterally movable slide mechanism generally designated y reference numeral 58 provided with slots 59 to accommodate movement relative to frame mounted guide pins 61. A spring 62 normally holds the slide mechanism 58 to the right as shown in FIG. 3 whereby carriage movement and the engagement of catch 53 with the lug 57 will move the slide mechanism 58 to the left. The slide mechanism 58 has an arm 63 which is provided with a pin 64 normally abutting the edge of the carriage return decelerating arm 41 as viewed in FIG. 3 whereby when the slide mechanism 58 moves leftwardly the arm 41 will be rocked counterclockwise. As is evident in FIG. 3, the catch 53 will engage the lug 57 several escapement increments, on the order of 0.7 inch, in advance of the engagement of the abutment screw 52 with the abutment or centerpost 56. Subsequent to engagement of the lug 57, and while the carriage is moving toward abutment 56, it will be decelerated to a velocity such that shock and noise will be minimized when it encounters abutment 56.

With reference to FIG. 5 carriage velocity is plotted against carriage position relative to the point of engagement of elements 53 and 57. Representative curves a, b and c represent high, low and zero initial carriage velocity at the time of engagement of the carriage and decelerating mechanism. When a carriage return is called with the carriage mounted margin stop some distance away from the centerpost 56 such as at position 65, the motor pulled carriage will attain a maximum velocity before the catch 53 encounters the lug 57 which point of engagement is represented by line 66. After the catch 53 engages and moves the slide mechanism 58 and rocks arm 41, the rocking motion of the latter will be resisted by the spring 25, its ends moving toward one another, until its resistance to carriage movement causes the carriage return clutch to slip as at position 67, and until the energy stored in the circular spring 25 overcomes and drives the flywheel 39 at an increasing rate. The movement of one end 24 of the circular spring 25 applies through its other end 26 a torque to crank 28 which through the one way wrap spring clutch 31 transfers the energy to the flywheel 39. When the carriage hits the final stop designated as line 68, energy remaining in the flexed circular spring 25 will be transferred to the flywheel 39. In this high velocity case where the carriage is moving at 22 inches/sec., the mass will not move significantly before the carriage hits the final stop. In this short time, virtually all the energy will be in the circular spring 25 at the point of arrest, none having been transferred to the flywheel 39. The spring constant may therefore be chose to determine final impact velocity.

When a carriage return is called with the carriage margin stop catch 53 only a few spaces in advance of the abutment 56 as at position 71 such that the carriage cannot reach maximum velocity before the catch 53 encounters the lug 57, the deceleration of the carriage toward the final stop is as indicated by curve b.

Finally, should a carriage return be initiated with the carriage positioned a few spaces from the margin stop as at position 72, within the deceleration zone between lines 66 and 68, the control of carriage velocity by the decelerating arm 41 (or 16) occurs immediately as indicated by curve c; the dip in the curve c representing override by the flywheel 39.

In the latter instances where the carriage velocity is less than maximum, or zero velocity when the arm 41 (or 16) is encountered, the energy transferred to the circular spring 25 will be more gradual and the flywheel 39 will be accelerated to dissipate most of the spring energy as it is accumulated. In effect then, the circular spring 25 acts simply as a motion transmitter, its spring constant being immaterial. Thus the size of the mass element or flywheel 39 can be chosen for the desired impact velocity.

TABULATION

With reference to FIG. 4, when a tab operation is initiated as understood in the art, the escapement is disabled releasing the carriage for movement by the spring drum, in the direction of arrow 74, and a tab blade 75 is moved, inwardly into the plane of the paper and latched in the path of a set stop 76. A cushion link 77 movable inwardly together with the tab blade 75 into the path of a set stop 76 and pivotally mounted for clockwise movement by a set stop 76, is provided with a rearwardly extending pin 78 operable to rock the tab decelerating arm 16 when the cushion link 77 s rocked by carriage movement thereby to decelerate the carriage in the distance between the point of engagement and the final stop. When the tab blade 75 is engaged and pushed against the abutment 56 by the cushion link 77, it knocks off the tab latch to permit the escapement to regain control of the carriage and the tab blade 75 and cushion link 77 to be restored. The deceleration of the carriage during high, low, and zero velocity tabulating conditions is similar to that occurring during carriage return movement.

While the system described above is rotational, it may also be linear.

The invention I claim is:

1. In a typewriter having a power driven carriage,
    mechanism for decelerating said carriage as it travels through a predetermined portion of its travel in advance of a final stop comprising,
    an arm pivotally supported for rocking movement in response to said carriage travel through said predetermined portion of its travel.
    a substantially circular spring connected at one end to said arm,
    a flywheel,
    and one way clutch means connected to the other end of said spring and responsive to the energy stored in said spring to drive said flywheel.

2. Decelerating mechanism for a power driven typewriter carriage comprising:
    a frame supporting said typewriter carriage for movement,
    a carriage movement arresting final stop on said frame,
    a first part on said typewriter carriage located to encounter said final stop whereby carriage movement is arrested,
    a second part on said carriage,
    a movable means mounted on said frame for limited movement by said second part during carriage movement through a limited distance in advance of said final stop,
    rotatable energy dissipative means,
    and a spring connected at one end to said movable means and at its other end to drive said rotatable energy dissipative means whereby the energy will be transferred to and accumulated in said spring for subsequent transfer to said rotatable energy dissipative means as determined by the velocity of carriage movement when said second part encounters said movable means.